United States Patent
Akama et al.

(10) Patent No.: US 8,385,922 B2
(45) Date of Patent: Feb. 26, 2013

(54) MOBILE TERMINAL AND COMMUNICATION METHOD

(75) Inventors: Katsuaki Akama, Kawasaki (JP); Tohru Ida, Kawasaki (JP); Kazutaka Satoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 12/947,913

(22) Filed: Nov. 17, 2010

(65) Prior Publication Data

US 2011/0117920 A1 May 19, 2011

(30) Foreign Application Priority Data

Nov. 18, 2009 (JP) ................................ 2009-263347

(51) Int. Cl.
*H04W 36/00* (2009.01)

(52) U.S. Cl. ..... 455/442; 455/443; 455/436; 455/435.2; 455/435.1; 455/432.1; 455/444

(58) Field of Classification Search ................ 455/442, 455/448, 406, 444; 370/252
See application file for complete search history.

(56) References Cited

U.S. PATENT DOCUMENTS

| | | | | |
|---|---|---|---|---|
| 5,278,991 A * | 1/1994 | Ramsdale et al. | ............ | 455/444 |
| 6,201,957 B1 * | 3/2001 | Son et al. | ...................... | 455/406 |
| 2009/0285113 A1 * | 11/2009 | Yavuz et al. | .................. | 370/252 |
| 2011/0105132 A1 * | 5/2011 | Vasudevan et al. | ........... | 455/448 |

FOREIGN PATENT DOCUMENTS

| | | |
|---|---|---|
| JP | 2005-318646 A | 11/2005 |
| WO | WO 2008/033259 | 3/2008 |

OTHER PUBLICATIONS

"Extended European Search Report", mailed by EPO and corresponding to European application No. EESR-10190723.6 on Feb. 14, 2011, with English translation.
Huawei: "Access Control Requirements in Rel-9", 3GPP Draft; S2-090207, 3RD Generation Partnership Project (3GPP), Mobile Competence Centre; 650, Route Des Lucioles; F-06921 Sophia-Antipolis Cedex; France, No. Phoenix; Jan. 7, 2009, XP050332785, [retrieved on Jan. 7, 2009].
NEC: "Temporary CSG membership handling", 3GPP Draft; R3-092801_TEMPORARY CSG SUBSCRIPTION_DISC, 3rd Generation Partnership Project (3GPP), Mobile Competence Centre; 650, Route Des Lucioles; F-06921 Sophia-Antipolis Cedex; France, No. Jeju; Nov. 9, 2009, XP050392296, [retrieved on Nov. 19, 2009].

* cited by examiner

*Primary Examiner* — David Q Nguyen
(74) *Attorney, Agent, or Firm* — Fujitsu Patent Center

(57) ABSTRACT

A mobile terminal used in a wireless communication system including a first wireless base station where a handover is not allowed between the same type of wireless base stations and a second wireless base station where a handover is allowed between the same type of wireless base stations, the mobile terminal includes a handover executing unit which executes first handover processing that switches a communication destination of the mobile terminal from the first wireless base station to the second wireless base station while communicating with the first wireless base station and a disconnecting unit which disconnects communication between the mobile terminal and the second wireless base station when the communication destination of the mobile terminal has not returned from the second wireless base station to the first wireless base station within a predetermined time.

9 Claims, 5 Drawing Sheets

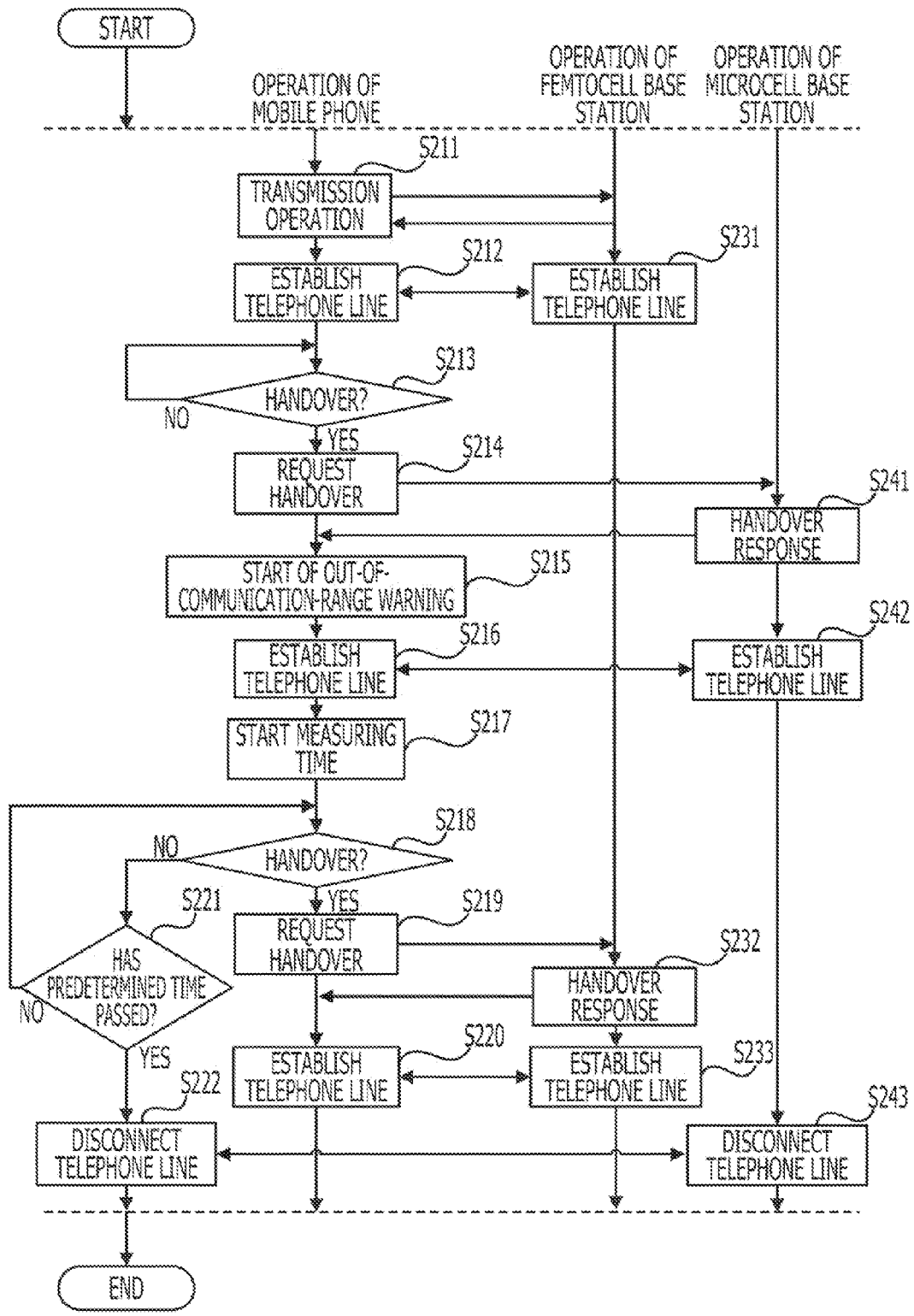

… (1)

MOBILE TERMINAL AND COMMUNICATION METHOD

CROSS-REFERENCE TO RELATED APPLICATIONS

This application is based upon and claims the benefit of priority of the prior Japanese Patent Application No. 2009-263347, filed on Nov. 18, 2009, the entire contents of which are incorporated herein by reference.

FIELD

The present invention relates to a technical field of a mobile terminal such as a mobile phone and a communication method of such a mobile terminal.

BACKGROUND

As a wireless base station used in a wireless communication system such as a mobile phone system, an extremely small scale wireless base station whose coverage area (specifically, cell radius) is several meters to tens of meters or several tens of meters is proposed. Such a small scale wireless base station is called a "femtocell base station", for example, Home NodeB (HNB), and a cell formed by such a small scale wireless base station is called a "femtocell". The cell radius of the femtocell is extremely small compared to a cell generally called a "macrocell" having a cell radius of several kilometers to about 10 km or a cell called a "microcell" having a cell radius of several hundreds of meters to about 1 km.

On the other hand, in such a wireless communication system, a technique for limiting or selectively allowing a moving range of a mobile terminal such as a mobile phone is proposed. Specifically, a technique for registering service types available in a home zone data area of a mobile terminal and service types available in zones other than the home zone in only one HLR (Home Location Register) including a plurality of wireless base stations under the control thereof, and limiting or selectively allowing available services and handovers when the mobile terminal is outside the home zone is proposed in Japanese Laid-open Patent publication No. 2005-318646.

SUMMARY

According to an aspect of the invention, a mobile terminal is used in a wireless communication system that includes a first wireless base station where a handover is not allowed between the same type of wireless base stations and a second wireless base station where a handover is allowed between the same type of wireless base stations; the mobile terminal includes a handover executing unit which executes first handover processing that switches a communication destination of the mobile terminal from the first wireless base station to the second wireless base station while communicating with the first wireless base station, and includes a disconnecting unit which disconnects communication between the mobile terminal and the second wireless base station when the communication destination of the mobile terminal has not returned from the second wireless base station to the first wireless base station within a predetermined time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a flowchart showing a flow of an operation related to handover of a mobile phone in an operation of the wireless communication system according to the embodiment.

DESCRIPTION OF EMBODIMENT

In a case of using a femtocell base station, even when a mobile terminal moves only a little, the mobile terminal may move out of the femtocell due to the extremely small cell radius of the femtocell.

In this case, to maintain the communication of the mobile terminal, it is considered desirable that a handover is performed. However, in general, the femtocell base stations are often discontinuously or randomly arranged. In addition, since the cell radius of the femtocell is extremely small, there are cases in which a handover from a femtocell base station to another femtocell base station cannot be performed properly. In other words, regarding the femtocell base stations, there are cases in which a handover between the same type of wireless base stations cannot be performed properly.

On the other hand, as a solution for such a case, it is considered that the HLR described above is used. In this case, to use the HLR, base station information related to the femtocell base stations needs to be registered in the HLR. However, it is assumed that the femtocell base stations are freely installed by users of mobile terminals. Therefore, it is technically difficult for only one HLR to manage all the base station information of countless femtocell base stations that are installed freely.

A method can be considered in which communication is maintained by permitting a handover from a femtocell base station to a microcell base station or a macrocell base station, instead of a handover from a femtocell base station to another femtocell base station. However, a case is considered in which a user is unaware that a handover from a femtocell base station to a microcell base station or a macrocell base station is being performed. In this case, communication that uses a microcell base station or a macrocell base station that has a billing system different from that of a femtocell base station may be continued without change. As a result, it is assumed that communication charges higher than those anticipated by the user may be generated.

Hereinafter, a preferred embodiment will be described with reference to the drawings. In the description below, a mobile phone is used as an example of the mobile terminal. However, it is not limited to mobile phones, but various information terminals such as a PDA, a mini personal computer, a note type personal computer, and a desktop personal computer that have a wireless communication function may also be used as an example of the mobile terminal.

(1) System Configuration Diagram

Figure 1:
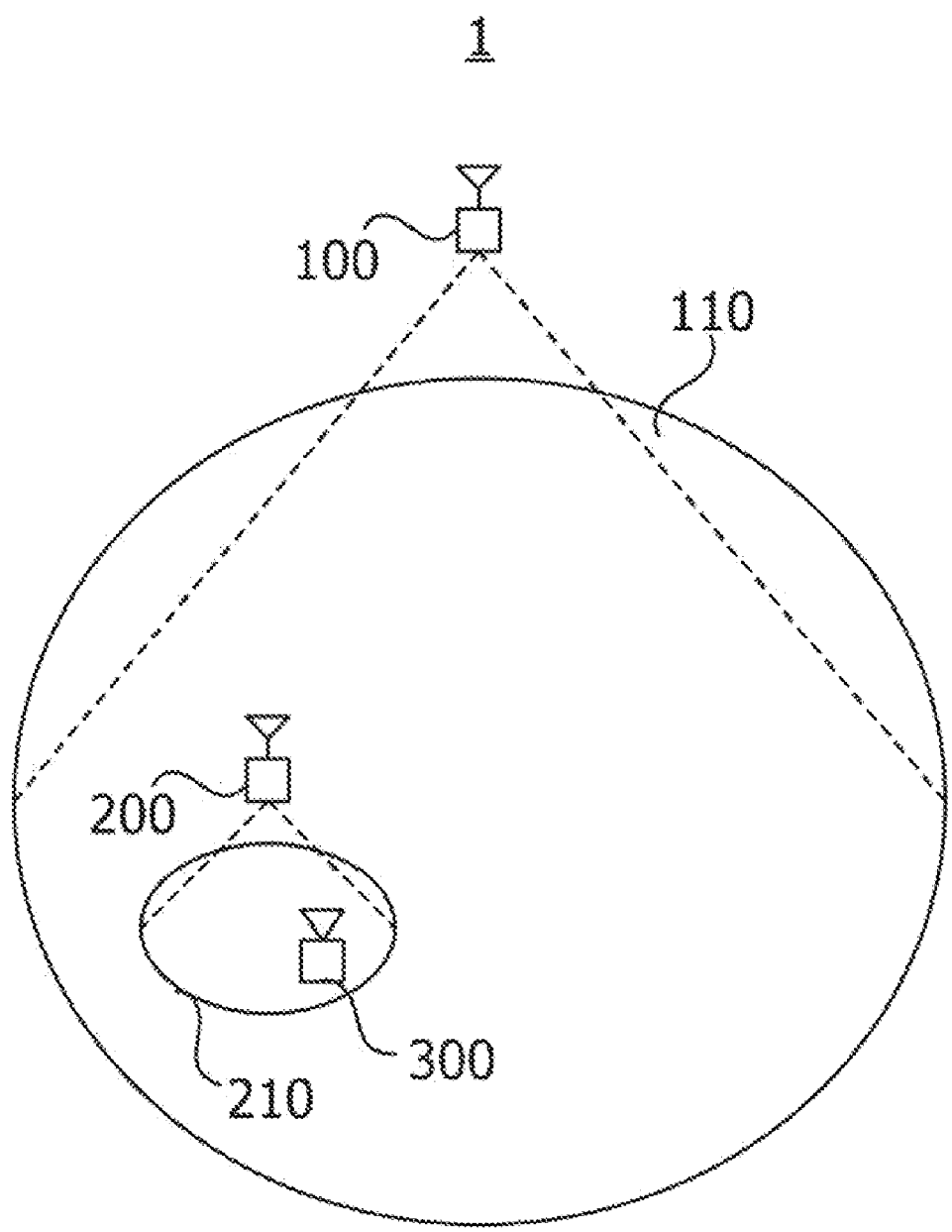
FIG. 1 is a block diagram showing a basic configuration of a wireless communication system according to an embodiment.

A basic configuration of a wireless communication system 1 according to the embodiment will be described with reference to FIG. 1. FIG. 1 is a block diagram schematically showing the basic configuration of the wireless communication system 1 according to the embodiment.

As shown in FIG. 1, the wireless communication system 1 according to the embodiment includes a microcell base station 100, a femtocell base station 200, and a mobile phone 300. The number of microcell base stations 100, the number of femtocell base stations 200, and the number of mobile phones 300 shown in FIG. 1 are an example, and the number of microcell base stations 100, the number of femtocell base stations 200, and the number of mobile phones 300 are not limited to the numbers shown in FIG. 1.

The microcell base station 100 is a specific example of a "second wireless base station" and is a wireless base station that covers a microcell 110 having a cell radius of approximately several hundreds of meters to 1 km. The microcell base station 100 performs wireless communication with the mobile phone 300 located in the microcell 110 covered by the microcell base station 100. Specifically, the microcell base station 100 establishes a communication connection with the mobile phone 300 located in the microcell 110 covered by the microcell base station 100, and transmits and receives data to and from the mobile phone 300.

Instead of the microcell base station 100, it is possible to use a macrocell base station that covers a macrocell having a cell radius of approximately several to tens of kilometers or several tens of kilometers. Alternatively, instead of the microcell base station 100, it is possible to arrange various wireless base stations that cover a cell having a cell radius of other sizes.

The femtocell base station 200 is a specific example of a "first wireless base station" and is a wireless base station, a so-called home wireless base station, that covers a femtocell 210 having a cell radius of approximately several to tens of meters or several tens of meters. The femtocell base station 200 performs wireless communication with the mobile phone 300 located in the femtocell 210 covered by the femtocell base station 200. Specifically, the femtocell base station 200 establishes a communication connection with the mobile phone 300 located in the femtocell 210 covered by the femtocell base station 200, and actually performs wireless communication with the mobile phone 300. A part of the femtocell 210 covered by the femtocell base station 200 may be overlapped with part or all of the microcell 110, or all of the femtocell 210 may not be overlapped with the microcell 110. In FIG. 1, an example in which all of the femtocell 210 is overlapped with the microcell 110 is shown.

The mobile phone 300 is a mobile terminal that establishes a connection with the microcell base station 100 of the microcell 110 in which the mobile terminal is located and transmits and receives data to and from the microcell base station 100. The mobile phone 300 is a mobile terminal that establishes a connection with the femtocell base station 200 of the femtocell 210 in which the mobile terminal is located, and transmits and receives data to and from the femtocell base station 200. The mobile phone 300 can use various services and applications, for example, a mail service, a voice call service, a web browsing service, and a packet communication service, via the microcell base station 100 and the femtocell base station 200, and in addition, a higher level station not shown in the figures which is connected to a system higher than the microcell base station 100 and the femtocell base station 200.

It is preferable that the two types of wireless base stations described above (that is, the microcell base station 100 and the femtocell base station 200) are distinguished, in other words defined, from the viewpoints described below.

First, as described above, the two types of wireless base stations may be distinguished in accordance with the radius of the cell. Specifically, it may be defined that one wireless base station (for example, the femtocell base station 200) is a wireless base station that covers a cell (for example, the femtocell 210) having a radius of several to tens of meters or several tens of meters. On the other hand, it may be defined that the other wireless base station, for example the microcell base station 100, is a wireless base station that covers a cell, for example the microcell 110, having a radius different from, preferably larger than, that of the femtocell 210.

Alternatively, the two types of wireless base stations may be distinguished in accordance with whether or not handover is allowed between the same type of wireless base stations. Specifically, it may be defined that one wireless base station (for example, the femtocell base station 200) is a wireless base station where handover is not allowed, in other words limited, difficult, or impossible, between the same type of wireless base stations, for example, between two femtocell base stations 200. Specifically, the mobile phone 300 communicating with one femtocell base station 200 cannot perform handover to change the communication destination of the mobile phone 300 from the one femtocell base station 200 to another femtocell base station 200. On the other hand, it may be defined that the other wireless base station, for example the microcell base station 100, is a wireless base station where handover is allowed, in other words is possible or not limited, between the same type of wireless base stations, for example, between two microcell base stations 100. Specifically, the mobile phone 300 communicating with one microcell base station 100 can perform handover to change the communication destination of the mobile phone 300 from the one microcell base station 100 to another microcell base station 100.

Alternatively, the two types of wireless base stations may be distinguished in accordance with whether or not the mobile phone 300 is connected to a higher station via home equipment of a user, for example, a user of the mobile phone 300). Examples of the home equipment of a user include, for example, a broadband line such as an ADSL line and an optical line whose access point or connection terminal is installed in the user's home, and another communication line whose access point or connection terminal is installed in the user's home. Examples of the higher station include, for example, a core network including a radio network controller (RNC), a subscriber exchange, a transit exchange, a gateway exchange, and the like, and an evolved packet core system (EPC) including a mobility management entity (MME), a gateway (GW), and the like. Specifically, one wireless base station, for example the femtocell base station 200, may be defined as a wireless base station connected to a higher station via home equipment of a user. On the other hand, the other wireless base station (for example, the microcell base station 100) may be defined as a wireless base station connected to a higher station without using a user's home equipment.

The two types of wireless base stations may also be distinguished in accordance with a billing system. Specifically, one wireless base station, for example the femtocell base station 200) may be defined as a wireless base station charged by a first billing system, for example, a flat-rate system. On the other hand, the other wireless base station, for example, the microcell base station 100, may be defined as a wireless base station charged by a second billing system different from the first billing system, for example, a metered-rate system.

Alternatively, the two types of wireless base stations may be distinguished in accordance with whether or not the wireless base station is allowed to directly and simultaneously connect to a plurality of higher stations, for example, a plurality of gateways. Specifically, it may be defined that one wireless base station, for example, the femtocell base station 200, is a wireless base station that is not allowed to directly and simultaneously connect to a plurality of higher stations located in a layer directly above the layer in which the wireless base station is located; in other words, is allowed to connect to only a single higher station at the same time. On the other hand, it may be defined that the other wireless base station, for example, the microcell base station 100, is a wireless base station that is allowed to directly and simultaneously connect to a plurality of higher stations located in a layer directly above the layer in which the wireless base station is located. The distinction between the two types of wireless base stations from the above viewpoint is described in 3GPP-TS36.300. In 3GPP-TS36.300, one wireless base station, for example, the femtocell base station 200, is referred to as HeNB (Home e NodeB) and the other wireless base station, for example, the microcell base station 100, is referred to as eNB (e NodeB).

The two types of wireless base stations may also be distinguished in accordance with whether the wireless base station is allowed to communicate with only specific mobile phones 300 among a plurality of mobile phones 300, or is allowed to communicate with all mobile phones 300 of the plurality of mobile phones 300. Specifically, one wireless base station, for example, the femtocell base station 200, may be defined as a wireless base station that is allowed to communicate with only specific mobile phones 300 among a plurality of mobile phones 300. On the other hand, the other wireless base station, for example, the microcell base station 100, may be defined as a wireless base station that is allowed to communicate with all the mobile phones 300 of the plurality of mobile phones 300. The distinguishing of the two types of wireless base stations described above corresponds to a distinguishing method from a viewpoint of CSG (Closed Subscriber Group) which is being standardized in 3GPP.

(2) Block Diagram

Figure 2:
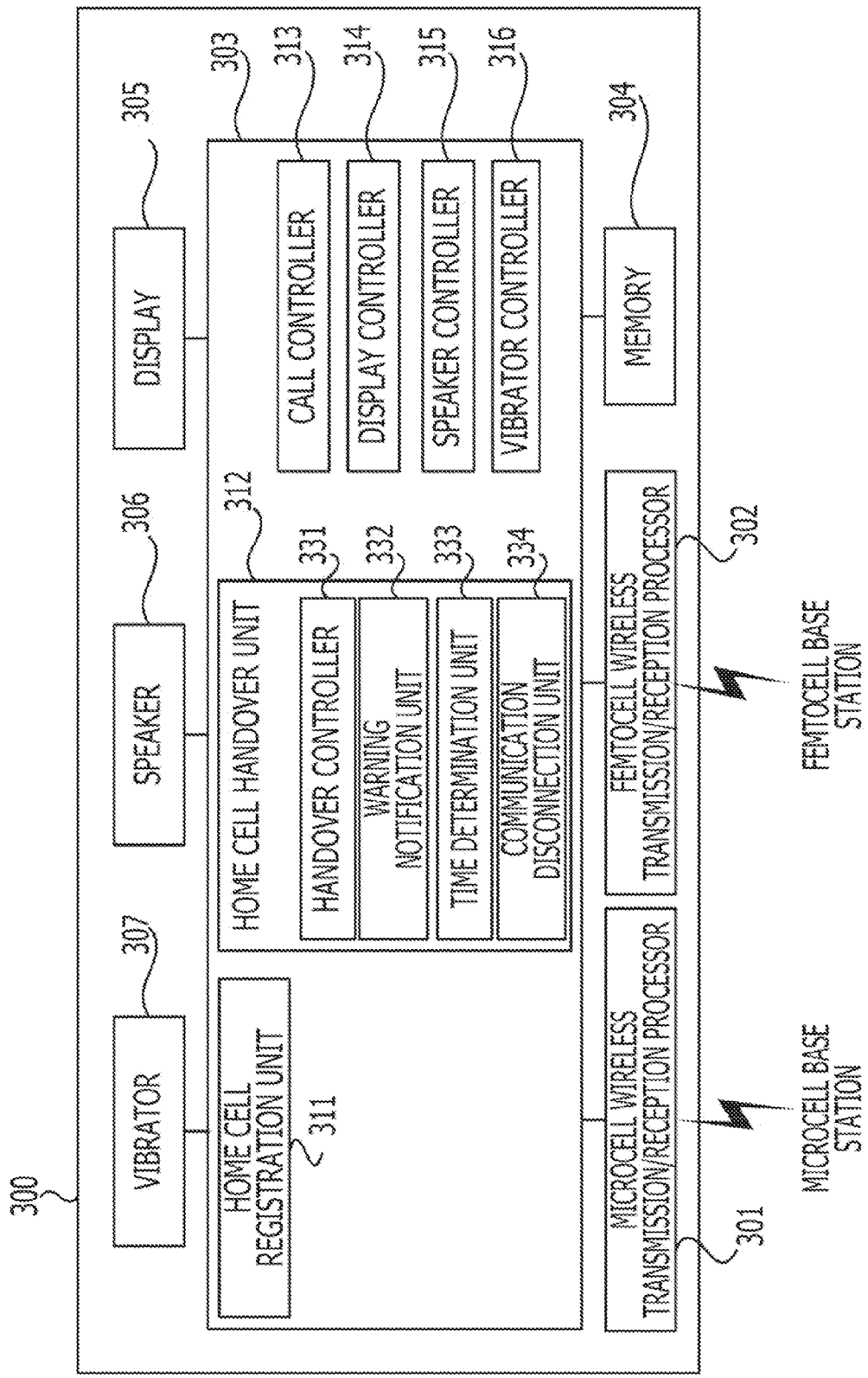
FIG. 2 is a block diagram showing a basic configuration of a mobile phone.

A basic configuration of the mobile phone 300 included in the wireless communication system 1 according to the embodiment will be described with reference to FIG. 2. FIG. 2 is a block diagram conceptually showing the basic configuration of the mobile phone 300.

The mobile phone 300 includes a microcell wireless transmission/reception processor 301, a femtocell wireless transmission/reception processor 302, a CPU 303, a memory 304, a display 305, a speaker 306, and a vibrator 307.

The microcell wireless transmission/reception processor 301 transmits data to the microcell base station 100 using radio waves and receives data transmitted from the microcell base station 100 using radio waves. Therefore, the microcell wireless transmission/reception processor 301 includes, for example, a baseband processing circuit that performs baseband processing including data coding processing, for example, error correction coding of convolution code, turbo code, or the like, or decoding processing, a modulation circuit that performs QPSK modulation and 16 QAM modulation, a demodulation circuit that performs demodulation processing, an RF circuit that adjusts transmission power or reception power, and an antenna that transmits or receives radio waves.

The femtocell wireless transmission/reception processor 302 transmits data to the femtocell base station 200 and receives data transmitted from the femtocell base station 200 using radio waves. Therefore, the femtocell wireless transmission/reception processor 302 includes, for example, a baseband processing circuit that performs baseband processing including data coding processing, for example, error correction coding of convolution code, turbo code, or the like, or decoding processing, a modulation circuit that performs QPSK modulation and 16 QAM modulation, a demodulation circuit that performs demodulation processing, an RF circuit that adjusts transmission power or reception power, and an antenna that transmits or receives radio waves.

The CPU 303 controls an operation of the entire mobile phone 300. The CPU 303 operates on the basis of, for example, predetermined firmware.

The CPU 303 includes, in particular, a home cell registration unit 311, a home cell handover unit 312, a call controller 313, a display controller 314, a speaker controller 315, and a vibrator controller 316, as logical or functional processing blocks configured therein. These processing blocks may be realized as an operation of part of a program of the firmware that controls an operation of the CPU 303, or may be realized as an operation of a program independent from the firmware. Alternatively, the home cell registration unit 311, the home cell handover unit 312, the call controller 313, the display controller 314, the speaker controller 315, and the vibrator controller 316 may be realized as a circuit independent from the CPU 303.

The home cell registration unit 311 registers information indicating a cell, for example, the above-describe microcell 110 and the femtocell 210, that should be used by the mobile phone 300 as home cell information 400 (refer to FIG. 4 described below). The home cell registration unit 311 configures a specific example of a "registration means".

The home cell handover unit 312 controls handover of the mobile phone 300. The home cell handover unit 312 includes, in particular, a handover controller 331, a warning notification unit 332, a time determination unit 333, and a communication disconnection unit 334, as logical or functional processing blocks configured therein.

The handover controller 331 performs handover for changing the communication destination of the mobile phone 300 from the microcell base station 100 to the femtocell base station 200 or from the femtocell base station 200 to the microcell base station 100. The handover controller 331 configures a specific example of a "first changing means" and a "second changing means".

When handover for changing the communication destination of the mobile phone 300 from the femtocell base station 200 to the microcell base station 100 is performed, the warning notification unit 332 notifies the user of a warning indicating that the handover is performed. For example, such a warning may be notified by a warning screen displayed on the display 305, may be notified by a warning sound output from the speaker 306, or may be notified by vibration of the vibrator 307. The warning notification unit 332 configures a specific example of "notification means".

The time determination unit 333 measures an elapsed time since the handover for changing the communication destination of the mobile phone 300 from the femtocell base station 200 to the microcell base station 100 is performed.

The communication disconnection unit 334 forcibly disconnects communication between the mobile phone 300 and the microcell base station 100. The communication disconnection unit 334 configures a specific example of a "disconnecting means".

The call controller 313 controls a call (that is, an operation from a call from the other side of the mobile phone 300 to communication completion) of the mobile phone 300.

The display controller 314 controls what is shown on the display 305. For example, the display controller 314 controls the display 305 so that warning information notified from the warning notification unit 332 is displayed on the display 305 as a warning screen.

The speaker controller 315 controls sound output from the speaker 306. For example, the speaker controller 315 controls the speaker 306 so that warning information notified from the warning notification unit 332 is output from the speaker 306 as a warning sound.

The vibrator controller 316 controls vibration of the vibrator 307. For example, the vibrator controller 316 controls the vibrator 307 so that warning information notified from the warning notification unit 332 is output from the vibrator 307 as vibration.

The memory 304 includes a storage area for temporarily storing data used in the mobile phone 300. The memory 304 may include a storage area (that is, firmware) for storing a program for performing an operation of the mobile phone 300. Examples of the memory 304 include, for example, a semiconductor memory such as RAM (Random Access Memory), and various other recording devices.

The display 305 displays display objects under control of the display controller 314. Examples of the display 305 include, for example, a liquid crystal display, an organic EL display, an inorganic EL display, and display devices employing various other methods.

The speaker 306 outputs a desired sound under control of the speaker controller 315.

The vibrator 307 generates vibration by driving a small built-in motor or the like under control of the vibrator controller 316.

(3) Operation Description

Operational flow of the wireless communication system 1 according to the embodiment will be described with reference to FIGS. 3 to 5.

(3-1) Registration Operation of Home Cell

A home cell registration operation in the mobile phone 300 in an operation of the wireless communication system 1 according to the embodiment will be described with reference to FIGS. 3 and 4. FIG. 3 is a flowchart conceptually showing the home cell registration operational flow in the mobile phone 300 in the operation of the wireless communication system according to the embodiment, and FIG. 4 is a data structure diagram conceptually showing home cell information to be registered.

Figure 3:
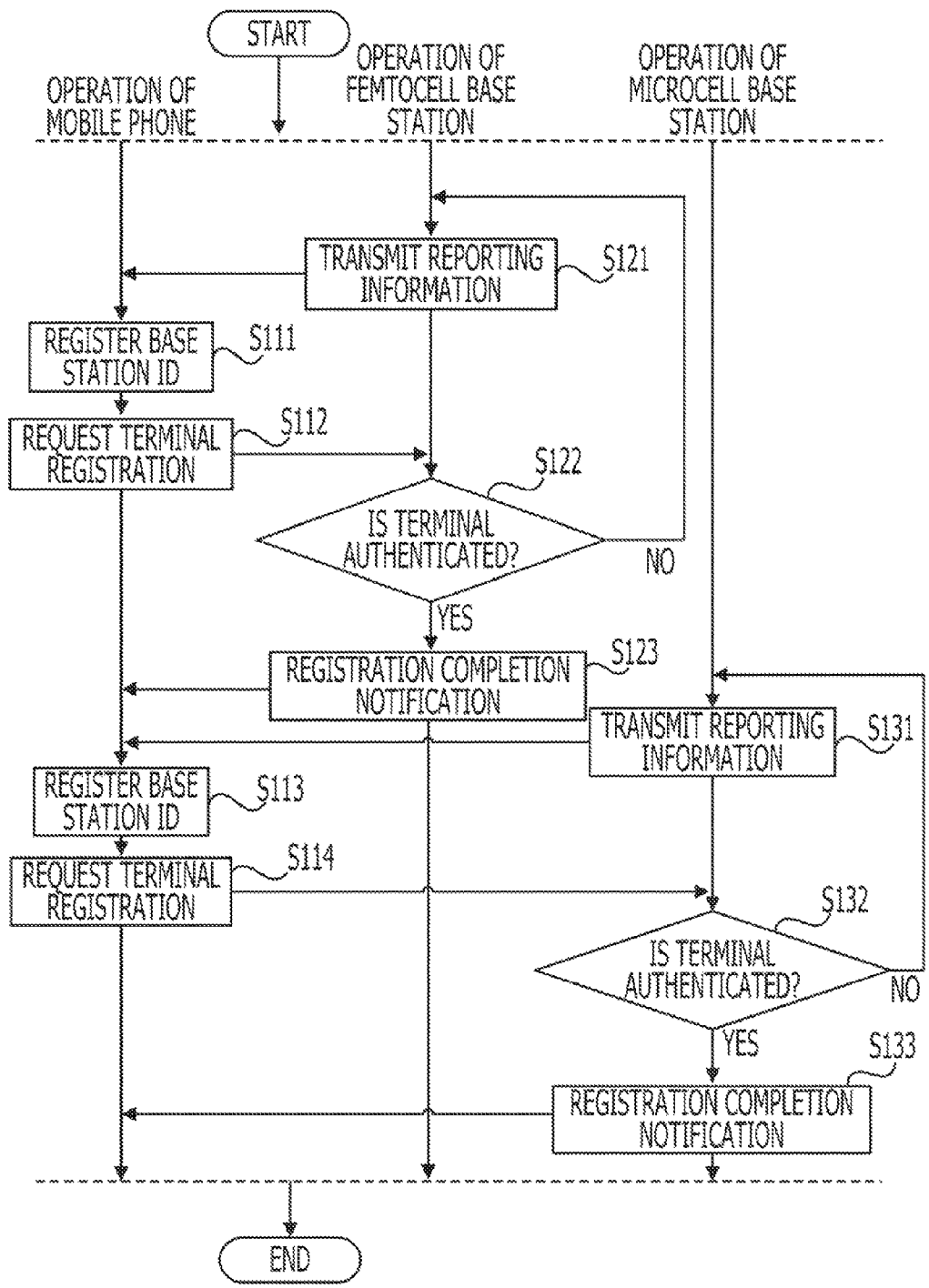
FIG. 3 is a flowchart showing a flow of a home cell registration operation in a mobile phone in an operation of the wireless communication system according to the embodiment.

As shown in FIG. 3, the femtocell base station 200 transmits reporting information to the mobile phone 300 (step S121). The reporting information includes, for example, information necessary for registering a position of the mobile phone 300.

Figure 4:
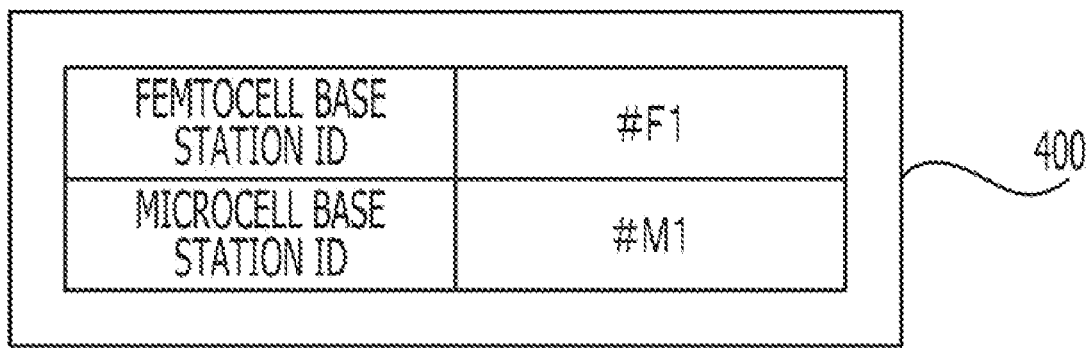
FIG. 4 is a data structure diagram showing home cell information to be registered.

The mobile phone 300, in particular the home cell registration unit 311 included in the mobile phone 300 that receives the reporting information transmitted from the femtocell base station 200, registers a base station ID of the femtocell base station 200 included in the reporting information as the home cell information 400 shown in FIG. 4 (step S111). It is preferred that the home cell information is recorded in, for example, the memory 305 or the like. FIG. 4 shows an example in which the base station ID of the femtocell base station 200 is "#F1".

Thereafter, the mobile phone 300 transmits a message requesting a terminal registration to the femtocell base station 200 (step S112). Then, the femtocell base station 200 that receives the message requesting the terminal registration performs authentication of the mobile phone 300 (step S122).

As a result of the authentication in step S122, if it is determined that the authentication of the mobile phone 300 is successfully performed (use of the femtocell base station 200 by the mobile phone 300 is allowed) (step S122: Yes), the femtocell base station 200 transmits a message to the mobile phone 300 notifying that the terminal registration is completed (step S123). Thereafter, the femtocell base station 200 may complete the operation or return to step S121 to continue transmitting the reporting information.

On the other hand, as a result of the authentication in step S122, if it is determined that the authentication of the mobile phone 300 is not successfully performed (use of the femtocell base station 200 by the mobile phone 300 is not allowed) (step S122: No), the femtocell base station 200 does not perform the terminal registration and returns to step S121 to continue transmitting the reporting information.

In tandem or in parallel with the above operation, the microcell base station 100 transmits reporting information to the mobile phone 300 (step S131).

The mobile phone 300 (in particular, the home cell registration unit 311 included in the mobile phone 300) that receives the reporting information transmitted from the microcell base station 100 registers a base station ID of the microcell base station 100 included in the reporting information as the home cell information 400 shown in FIG. 4 (step S113). FIG. 4 shows an example in which the base station ID of the microcell base station 100 is "#M1".

Thereafter, the mobile phone 300 transmits a message requesting a terminal registration to the microcell base station 100 (step S114). Then, the microcell base station 100 that receives the message requesting the terminal registration performs authentication of the mobile phone 300 (step S132).

As a result of the authentication in step S132, if it is determined that the authentication of the mobile phone 300 is successfully performed, meaning use of the microcell base station 100 by the mobile phone 300 is allowed (step S132: Yes), the microcell base station 100 transmits a message notifying that the terminal registration is completed to the mobile phone 300 (step S133). Thereafter, the microcell base station 100 may complete the operation or return to step S131 to continue transmitting the reporting information.

On the other hand, as a result of the authentication in step S132, if it is determined that the authentication of the mobile phone 300 is not successfully performed, meaning use of the microcell base station 100 by the mobile phone 300 is not allowed (step S132: No), the microcell base station 100 does not perform the terminal registration and returns to step S131 to continue transmitting the reporting information.

In the above operation, an operation other than the operation for registering the base station ID included in the reporting information as the home cell information 400 may be the same as a conventional operation for position registration (terminal registration) in HLR (Home Location Register). Therefore, to simplify the description, a detailed description of the operation other than the operation for registering the base station ID included in the reporting information as the home cell information 400 will be omitted.

(3-2) Handover Operation

An operation related to a handover of the mobile phone 300 in the operation of the wireless communication system 1 according to the embodiment will be described with reference to FIG. 5. FIG. 5 is a flowchart conceptually showing a flow of the operation related to a handover of the mobile phone 300 in the operation of the wireless communication system 1 according to the embodiment.

In the description below, an example will be described in which (i) even though the mobile phone 300 basically performs communication with the femtocell base station 200, (ii) only when the mobile phone 300 moves outside the range of the femtocell 210 covered by the femtocell base station 200 does the mobile phone 300 temporarily perform communication with the microcell base station 100 as a backup.

As shown in FIG. 5, the call controller 313 included in the mobile phone 300 refers to the base station ID of the femtocell base station 200 included in the home cell information 400. Thereafter, the call controller 313 performs transmission operation to the femtocell base station 200 corresponding to the referred base station ID (step S211). Based on this, a communication line between the mobile phone 300 and the femtocell base station 200 is established (steps S212 and S231).

Thereafter, the handover controller 331 included in the mobile phone 300 determines whether or not a handover needs to be performed (step S213). It is preferred that the handover controller 331 performs the determination in step S213 on the basis of the strength of radio waves from the femtocell base station 200. Specifically, it is preferred that the handover controller 331 determines that a handover need not be performed when the strength of radio waves from the femtocell base station 200 is greater than or equal to a predetermined threshold value. On the other hand, it is preferred that the handover controller 331 determines that a handover needs to be performed when the strength of radio waves from the femtocell base station 200 is smaller than the predetermined threshold value.

As a result of the determination in step S213, if it is determined that a handover need not be performed (step S213: No), the handover controller 331 included in the mobile phone 300 returns to step S213 to continue the operation to determine whether or not a handover needs to be performed.

On the other hand, as a result of the determination in step S213, if it is determined that a handover needs to be performed (step S213: Yes), the handover controller 331 included in the mobile phone 300 refers to the base station ID of the microcell base station 100 included in the home cell information 400. Thereafter, the handover controller 331 requests the microcell base station 100 corresponding to the referred base station ID to perform a handover (step S214).

The microcell base station 100 that receives the request of handover notifies the mobile phone 300 of accepting the request of handover (step S241).

The mobile phone 300, in particular the warning notification unit 332 included in the mobile phone 300 that receives the notification of accepting the request of handover, notifies the user of performing the handover (step S215). The notification of performing the handover may be performed by displaying a warning screen on the display 305 described above, by outputting a warning sound from the speaker 306 described above, or by vibration generated by the vibrator 307 described above. The warning notification is performed to notify the user that the mobile phone 300 is located outside or almost outside the range of the femtocell 210.

Thereafter, the handover controller 331 included in the mobile phone 300 controls the call controller 313 to perform the handover. Based on this, a communication line between the mobile phone 300 and the microcell base station 100 is established (steps S216 and S242).

At this time, the time determination unit 333 included in the mobile phone 300 starts measuring time, for example by starting a counter, at the same time when performing the handover (step S217).

Next, the handover controller 331 included in the mobile phone 300 determines whether or not a handover to the femtocell base station 200 is possible (step S218). More specifically, the handover controller 331 determines whether or not a handover to the femtocell base station 200 corresponding to the base station ID registered in the home cell information 400 is possible (step S214). It is preferred that the handover controller 331 performs the determination in step S218 on the basis of the strength of radio waves from the femtocell base station 200. Specifically, it is preferred that the handover controller 331 determines that a handover to the femtocell base station 200 is possible when the strength of radio waves from the femtocell base station 200 is greater than or equal to a predetermined threshold value. On the other hand, it is preferred that the handover controller 331 determines that a handover to the femtocell base station 200 is not possible when the strength of radio waves from the femtocell base station 200 is less than the predetermined threshold value.

As a result of the determination in step S218, if it is determined that the handover to the femtocell base station 200 is possible (step S218: Yes), the handover controller 331 included in the mobile phone 300 refers to the base station ID of the femtocell base station 200 included in the home cell information 400. Thereafter, the handover controller 331 requests the femtocell base station 200 corresponding to the referred base station ID to perform the handover (step S219).

The femtocell base station 200 that receives the request of handover notifies the mobile phone 300 of accepting the request of handover (step S232).

The mobile phone 300, in particular the handover controller 331 included in the mobile phone 300 that receives the notification of accepting the request of handover, controls the call controller 313 to perform the handover. In this way, a communication line between the mobile phone 300 and the femtocell base station 200 is established again (steps S220 and S233). At this time, notification of performing the handover may be given to the user. The notification may be performed by displaying a screen on the display 305 described above, by outputting a sound from the speaker 306 described above, or by vibration generated by the vibrator 307 described above. The notification is performed to notify the user that the mobile phone 300 is located inside the range of the femtocell 210.

On the other hand, as a result of the determination in step S218, if it is determined that the handover to the femtocell base station 200 is not possible (step S218: No), the time determination unit 333 included in the mobile phone 300 determines whether or not a predetermined time has passed since the handover was performed to establish the communication line between the mobile phone 300 and the microcell base station 100 (step S221). An example of the predetermined time is a time that can allow communication between the mobile phone 300 and the microcell base station 100, for example, from between tens or several tens of seconds, to one or several minutes. Alternatively, an example of the predetermined time is the time necessary for the user of the mobile phone 300 to move into the range of the femtocell 210, for example, from tens or several tens of seconds, to one minute or several minutes.

As a result of the determination in step S221, if it is determined that the predetermined time has not passed (step S221: No), the process returns to step S218 to continue the determination whether or not the handover to the femtocell base station 200 is possible.

On the other hand, as a result of the determination in step S221, if it is determined that the predetermined time has passed (step S221: Yes), the communication disconnection unit 334 included in the mobile phone 300 controls the call controller 313 so that the communication line between the mobile phone 300 and the microcell base station 100 is disconnected. In this way, even when communication is performed between the mobile phone 300 and the microcell base station 100, the communication line between the mobile phone 300 and the microcell base station 100 is forcibly disconnected (step S222 and S243). In this case, the mobile phone 300 may reestablish the communication line between the mobile phone 300 and the microcell base station 100 by performing a transmission operation to the microcell base station 100 again. Alternatively, the mobile phone 300 may reestablish the communication line between the mobile phone 300 and the femtocell base station 200 by again moving into the range of the femtocell 210.

As described above, according to the wireless communication system 1 of the embodiment, in particular the mobile phone 300 included in the wireless communication system 1, when the signal received from the femtocell base station 200 deteriorates, the handover processing for changing the communication destination of the mobile phone 300 to the microcell base station 100 is performed. Therefore, even when the signal received from the femtocell base station 200 deteriorates, the mobile phone 300 can continue communication using the microcell base station 100. Put simply, even when the mobile phone 300 moves a little and goes out of the range of the femtocell 210, the mobile phone 300 can continue communication using the microcell base station 100.

Even when the handover that changes the communication destination of the mobile phone 300 to the microcell base station 100 is performed, the communication destination of the mobile phone 300 is returned to the femtocell base station 200 within a predetermined time. Therefore, even when the mobile phone 300 moves a little and goes out of the range of the femtocell 210, the mobile phone 300 can again perform communication with the femtocell base station 200 while continuing communication using the microcell base station 100. Stated another way, even when the mobile phone 300 moves a little and goes out of the range of the femtocell 210, if the situation changes and communication between the mobile phone 300 and the femtocell base station 200 becomes possible within a predetermined time, the mobile phone 300 can again perform communication with the femtocell base station 200. In particular, when the radius of the femtocell 210 is extremely small, it is considered that the frequency of the mobile phone 300 moving out of the range of the femtocell 210 is high. Even in such a case, the mobile phone 300 can perform communication with the femtocell base station 200 while continuing communication. Therefore, the communication of the mobile phone 300 via the femtocell base station 200 can be suitably maintained.

Even when the handover that changes the communication destination of the mobile phone 300 to the microcell base station 100 is performed, if a situation in which the communication between the mobile phone 300 and the femtocell base station 200 can be performed does not occur in a predetermined time, the communication line between the mobile phone 300 and the microcell base station 100 is disconnected. In other words, the communication line between the mobile phone 300 and the microcell base station 100 is established for a predetermined time, and thereafter is forcibly disconnected. Therefore, it is possible to avoid a case in which long-time communication is conducted using the microcell base station 100 operated under a billing system different from that of the femtocell base station 200. Therefore, when the communication charge of the femtocell base station 200 is relatively inexpensive and the communication charge of the microcell base station 100 is relatively expensive, it is possible to appropriately avoid a problem in which an expensive communication fee is unexpectedly charged.

Each base station ID of the microcell base station 100 and the femtocell base station 200 to which a handover is possible is registered as the home cell information 400. Therefore, by referring to the home cell information 400, it is possible to perform a handover to the desired microcell base station 100 and femtocell base station 200.

When performing a handover to the microcell base station 100, the user can be notified by a warning indicating that the handover is being conducted. Therefore, the user can be made aware that he or she has moved out of the range of the femtocell 210. Therefore, the user can benefit from being able to easily determine his or her behavior after that. For example, it is possible for the user to recognize the communication state of the mobile phone 300, and then positively move to within range of the femtocell 210 or disconnect the communication that uses the microcell base station 100.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal used in a wireless communication system that includes a first wireless base station where a handover is not allowed between the same type of wireless base stations and a second wireless base station where a handover is allowed between the same type of wireless base stations, the mobile terminal comprising:
   a memory; and
   a processor that executes a procedure in the memory, the procedure including:
   a handover executing process which executes first handover processing that switches a communication destination of the mobile terminal from the first wireless base station to the second wireless base station while communicating with the first wireless base station; and
   a disconnecting process which disconnects communication between the mobile terminal and the second wireless base station when first and second criteria are met based on the communication destination, the first criterion indicating that the mobile terminal is to reconnect with the same originating first wireless base station, and the second criterion indicating that the reconnect occurs within a specified amount of time.

2. The mobile terminal according to claim 1, wherein the handover executing process executes second handover processing that returns the communication destination from the second wireless base station to the first wireless base station within the specified amount of time from when the first handover processing is executed.

3. The mobile terminal according to claim 1, wherein the procedure further includes a registration process which registers a first identification number for identifying the first wireless base station and a second identification number for identifying the second wireless base station,
   wherein the handover executing process executes the first handover processing that changes the communication destination from the first wireless base station indicated by the first identification number registered by the registration process to the second wireless base station indicated by the second identification number registered by the registration process by referring to the first identification number and the second identification number registered by the registration process.

4. The mobile terminal according to claim 1, wherein the procedure further includes a notification process which notifies a user of changing the communication destination from the first wireless base station to the second wireless base station when executing the first handover processing.

5. The mobile terminal according to claim 1, wherein the first wireless base station is a Home eNodeB and the second wireless base station is an eNodeB.

6. The mobile terminal according to claim 1, wherein
the first wireless base station is a wireless base station that covers a femtocell, and
the second wireless base station is a wireless base station that covers a cell whose radius is greater than that of the femtocell.

7. A mobile terminal used in a wireless communication system including a first wireless base station connected to a higher level station via home equipment of a user and a second wireless base station connected to a higher level station without using home equipment of a user, the mobile terminal comprising:
a memory; and
a processor that executes a procedure in the memory, the procedure including:
a handover executing process which executes first handover processing that switches a communication destination of the mobile terminal from the first wireless base station to the second wireless base station while communicating with the first wireless base station; and
a disconnecting process which disconnects communication between the mobile terminal and the second wireless base station when first and second criteria are met based on the communication destination, the first criterion indicating that the mobile terminal is to reconnect with the same originating first wireless base station, and the second criterion indicating that the reconnect occurs within a specified amount of time.

8. A communication method executed by a mobile terminal used in a wireless communication system including a first wireless base station where a handover is not allowed between the same type of wireless base stations and a second wireless base station where a handover is allowed between the same type of wireless base stations, the communication method comprising:
executing first handover processing that switches a communication destination of the mobile terminal from the first wireless base station to the second wireless base station while communicating with the first wireless base station; and
disconnecting communication between the mobile terminal and the second wireless base station when first and second criteria are met based on the communication destination, the first criterion indicating that the mobile terminal is to reconnect with the same originating first wireless base station, and the second criterion indicating that the reconnect occurs within a specified amount of time.

9. A wireless communication system comprising:
a first wireless base station for which a handover is not allowed between the same type of wireless base stations;
a second wireless base station for which a handover is allowed between the same type of wireless base stations; and
a mobile terminal which
executes first handover processing that switches a communication destination of the mobile terminal from the first wireless base station to the second wireless base station while communicating with the first wireless base station; and
disconnects communication between the mobile terminal and the second wireless base station when first and second criteria are met based on the communication destination, the first criterion indicating that the mobile terminal is to reconnect with the same originating first wireless base station, and the second criterion indicating that the reconnect occurs within a specified amount of time.

* * * * *